(12) United States Patent
Karis et al.

(10) Patent No.: US 7,820,601 B2
(45) Date of Patent: Oct. 26, 2010

(54) SYSTEM AND METHOD FOR IMPROVING LUBRICATION IN A FLUID DYNAMIC BEARING

(75) Inventors: Thomas E. Karis, Aromas, CA (US); Kunihiro Shida, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 914 days.

(21) Appl. No.: 11/495,108

(22) Filed: Jul. 28, 2006

(65) Prior Publication Data

US 2008/0026965 A1 Jan. 31, 2008

(51) Int. Cl.
C10M 135/18 (2006.01)
C10M 173/02 (2006.01)

(52) U.S. Cl. ...................... 508/363; 508/513
(58) Field of Classification Search .................. 508/363, 508/513
See application file for complete search history.

(56) References Cited

U.S. PATENT DOCUMENTS

| | | | |
|---|---|---|---|
| 4,298,481 A | 11/1981 | Clarke | |
| 4,606,890 A | 8/1986 | Fisk | |
| 5,022,492 A | 6/1991 | Ohno et al. | |
| 5,631,211 A | 5/1997 | Nakagawa et al. | |
| 5,712,230 A | 1/1998 | Abraham et al. | |
| 5,736,493 A | 4/1998 | Garnier | |
| 5,854,185 A | 12/1998 | Roth et al. | |
| 5,930,075 A | 7/1999 | Khan et al. | |
| 6,207,625 B1 | 3/2001 | Ogano et al. | |
| 6,329,327 B1 | 12/2001 | Tanaka et al. | |
| 6,465,399 B2 | 10/2002 | Koishikawa et al. | |
| 2002/0163281 A1* | 11/2002 | Rafaelof | 310/309 |
| 2003/0134753 A1 | 7/2003 | Stunkel et al. | |
| 2003/0148899 A1 | 8/2003 | Kuribayashi et al. | |
| 2004/0179758 A1 | 9/2004 | Ohno | |
| 2005/0090409 A1 | 4/2005 | Devlin et al. | |
| 2006/0019840 A1* | 1/2006 | Kawahara et al. | 508/280 |
| 2007/0281873 A1* | 12/2007 | Okada | 508/579 |
| 2008/0026965 A1 | 1/2008 | Karis et al. | |

FOREIGN PATENT DOCUMENTS

| | | |
|---|---|---|
| CN | 1098134 | 2/1995 |
| CN | 1524119 | 8/2004 |
| WO | WO 2004/018595 A1 * | 3/2004 |

* cited by examiner

*Primary Examiner*—Walter D Griffin
*Assistant Examiner*—Frank C Campanell

(57) ABSTRACT

A system and method for improving lubrication in a fluid dynamic bearing are disclosed. A fluid dynamic bearing comprising a rotor portion and a stator portion is formed. In addition, a lubricating fluid comprising a high pressure lubricant is provided between the rotor portion and the stator portion of the fluid dynamic bearing, wherein the high pressure lubricant provides extreme pressure protection of the rotor portion and the stator portion of the fluid dynamic bearing.

18 Claims, 6 Drawing Sheets

300

400

SYSTEM AND METHOD FOR IMPROVING LUBRICATION IN A FLUID DYNAMIC BEARING

TECHNICAL FIELD

This invention relates generally to the field of direct access storage devices and in particular to resolving boundary lubrication problems associated with start and stop of disk drives and associated with high and low operating temperatures.

BACKGROUND ART

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

Shown in FIG. 1A is the relationship of components and sub-assemblies of HDD 110 and a representation of data tracks 136 recorded on disk surface 135. The cover is removed and not shown so that the inside of HDD 110 is visible. FIG. 1B shows a similar HDD 110, but with all its components in an isometric blow-apart view. The components are assembled into base casting 113, which provides attachment and registration points for components and sub-assemblies. Data is recorded onto disk surface 135 in a pattern of concentric rings known as data tracks 136. Disk surface 135 is spun at high speed by means of a motor-hub assembly 130. Data tracks 136 are recorded onto disk surface 135 by means of magnetic head 156, which typically resides at the end of slider 155. FIG. 1A being a plan view shows only one head and one disk surface combination. One skilled in the art understands that what is described for one head-disk combination applies to multiple head-disk combinations. The embodied invention is independent of the number of head-disk combinations.

The dynamic performance of HDD 110 is a major mechanical factor for achieving higher data capacity as well as for manipulating this data faster. The quantity of data tracks 136 recorded on disk surface 135 is determined partly by how well magnetic head 156 and a desired data track 136 can be positioned to each other and made to follow each other in a stable and controlled manner. There are many factors that will influence the ability of HDD 110 to perform the function of positioning magnetic head 156, and following data track 136 with magnetic head 156. In general, these factors can be put into two categories; those factors that influence the motion of magnetic head 156; and those factors that influence the motion of data track 136. Undesirable motions can come about through unwanted vibration and undesirable tolerances of components. Herein, attention is given to motor-hub assembly 130, which attaches to base casting 113, and in particular, attention is given to the fluid dynamic bearing inside motor-hub assembly 130.

Market demand for more performance from the HDD has led to advances in motor-hub assembly technology. Of particular interest is the introduction of fluid dynamic bearings (FDB). By using an FDB in an HDD, disk surface 135 can be spun at faster speeds with less unwanted vibrations traditionally experienced with ball bearings. Since there is minimal contact between moving parts, an FDB will not wear as quickly as a traditional ball bearing.

A fluid dynamic bearing is the result of a thin layer of fluid, such as oil, moving between two juxtaposed surfaces and thus creating a barrier between the two surfaces that prevents their contact. Methods have been varied for moving the fluid to generate the FDB. One early method of moving the fluid was to use a pump that was external to the juxtaposed surfaces. This is costly for HDD application. The more widely used method for moving the fluid is to create a pattern of grooves on the juxtaposed surfaces that create internal pressure on the fluid when such surfaces are moved with respect to each other.

One problem is that at start and stop of the HDD and at extremely low or high operating temperatures, metal surfaces may contact, leading to accelerated wear. This contact leads to particulate contamination of the lubrication fluid and greatly decreases the life of the bearing.

SUMMARY OF THE INVENTION

A system and method for improving lubrication in a fluid dynamic bearing are described herein. In one embodiment, a fluid dynamic bearing comprising a rotor portion and a stator portion is formed. In addition, a lubricating fluid comprising a high pressure lubricant is provided between the rotor portion and the stator portion of the fluid dynamic bearing, wherein the high pressure lubricant provides extreme pressure protection of the rotor portion and the stator portion of the fluid dynamic bearing.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
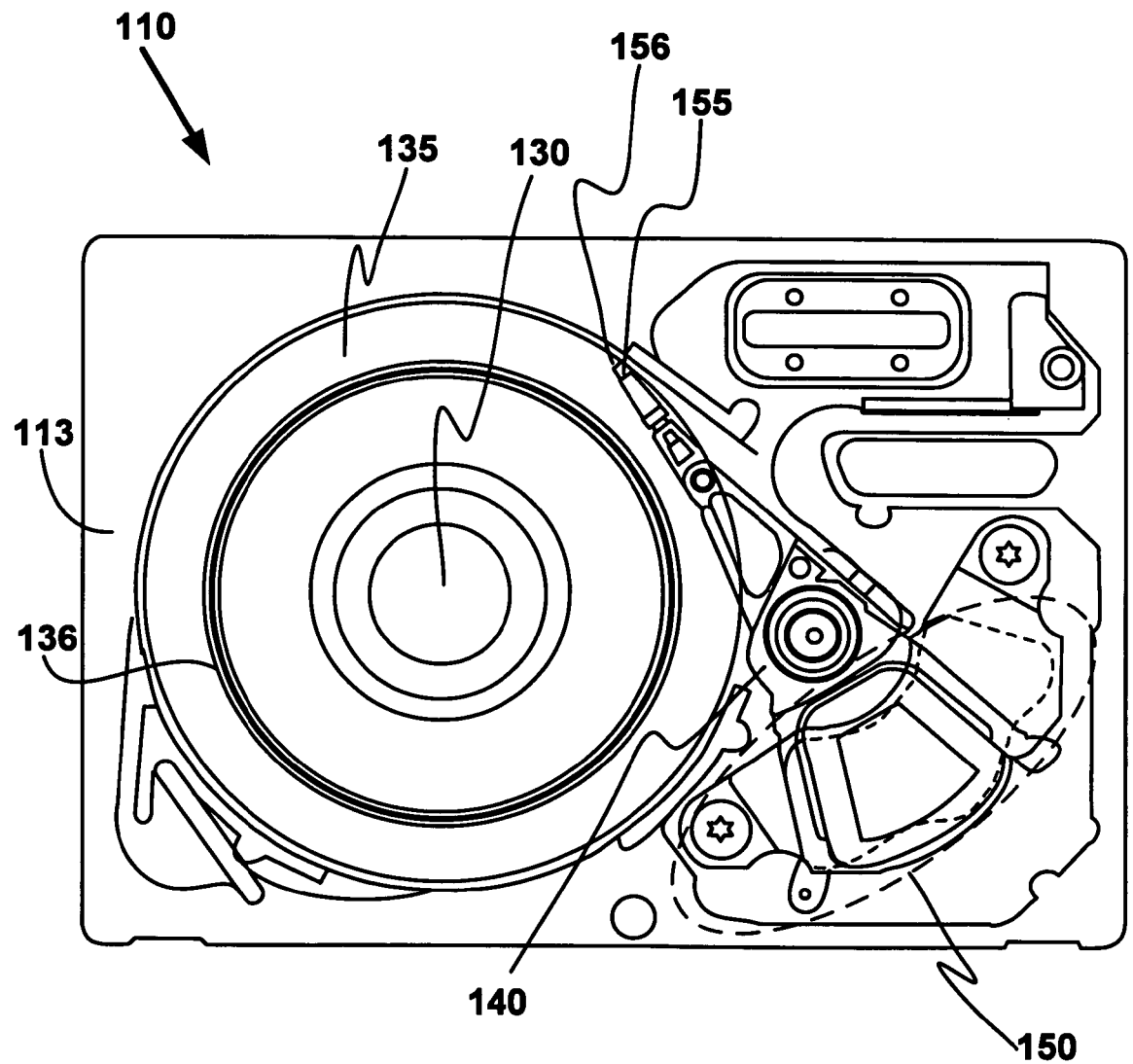
FIG. 1A is a plan view of an HDD with cover and top magnet removed in accordance with one embodiment of the present invention.

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected therewith. The discussion will then focus on embodiments of a system and method for improving lubrication in an FDB. Although the FDB is shown in a hard disk drive, it is understood that the embodiments described herein are useful in an FDB regardless of whether or not the FDB is a portion of a hard disk drive. The utilization of the FDB within the HDD is only one embodiment and is provided herein merely for purposes of brevity and clarity.

Disk drive fluid bearing spindle motors, especially higher performance motors for server drives operating at 10,000 or more RPMs, place severe demands on less than 10 mg of oil. An oil film approximately 10 microns or less in thickness is sandwiched between the rotor and the stator. Bearing stiffness is provided by a groove pattern on one of the surfaces. Vector components of the pressure are engineered to provide both radial and axial stiffness during operation at full design speed.

As designed, the only time that metal surfaces are in the boundary lubrication regime is briefly during start and stop operation. Boundary lubrication is when the thickness of the lubrication fluid is close to the surface roughness of one or more of the surfaces. For example, suppose the surface roughness of one metal surface is 0.2 microns. Boundary lubrication occurs as the lubrication fluid thickness approaches 0.2 microns or less.

During operation at normal temperatures, adequate safety margins are built into the design so that everywhere within the limits of manufacturing tolerances, the clearance between the rotating metal surfaces exceeds the maximum surface roughness height. In one embodiment of the invention, a combination of high and low temperature (e.g., phenolic and amine) antioxidants provide sufficient oxidation stability to the oil.

Embodiments of the present invention improve motor reliability by incorporating boundary lubrication or extreme pressure lubrication additives in the oil along with antioxidants to protect rotating components of the bearing during boundary lubrication (e.g., at start and stop operation). The high pressure lubricants prevent contact welding and asperity wear during boundary sliding, especially during start stop, but also in stressed of operation beyond the normal limits of shock loading or in case of metallic particulate contamination.

Physical Description

Figure 1B:
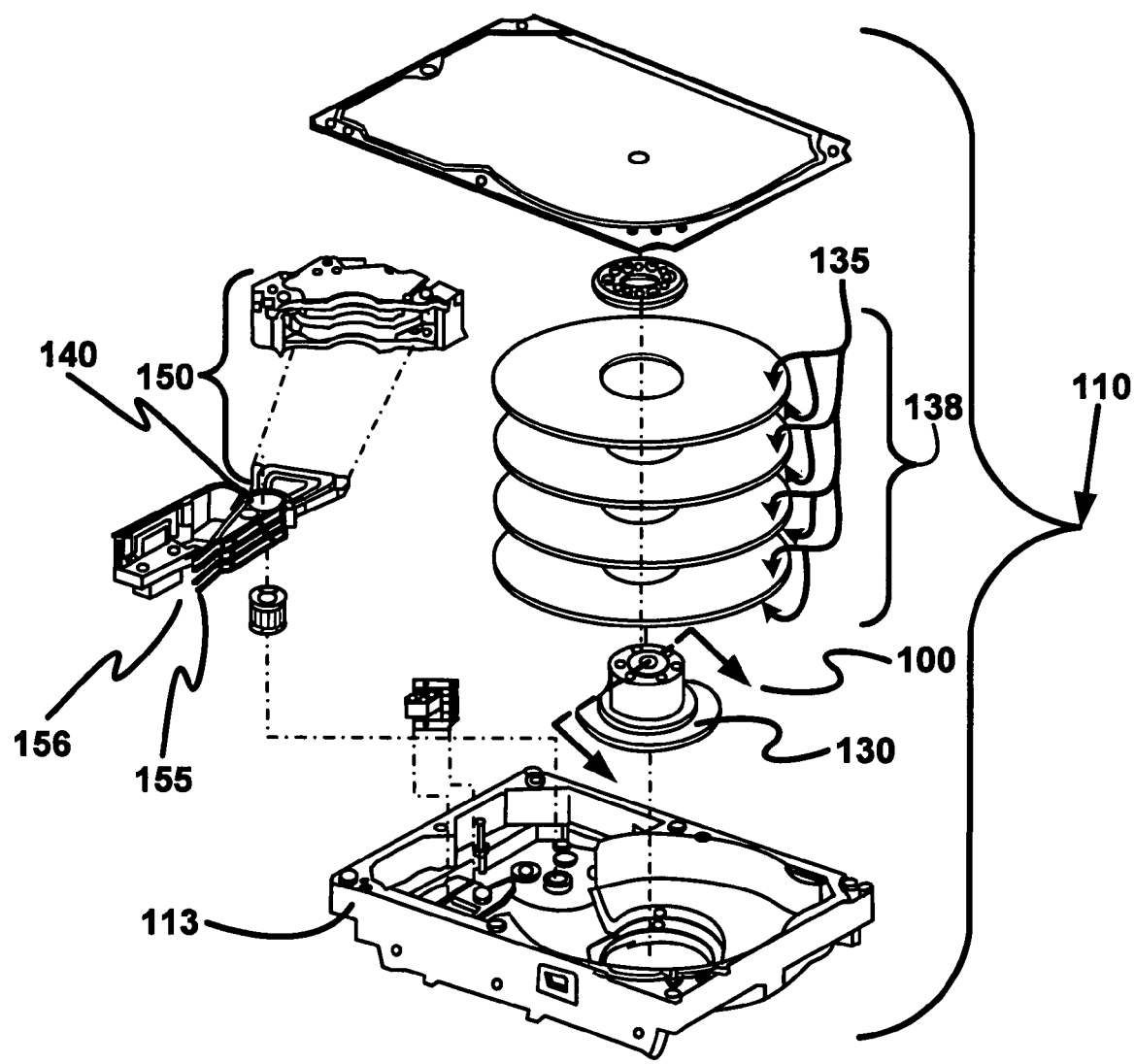
FIG. 1B is an isometric blow-apart of an HDD in accordance with one embodiment of the present invention.
Figure 2:
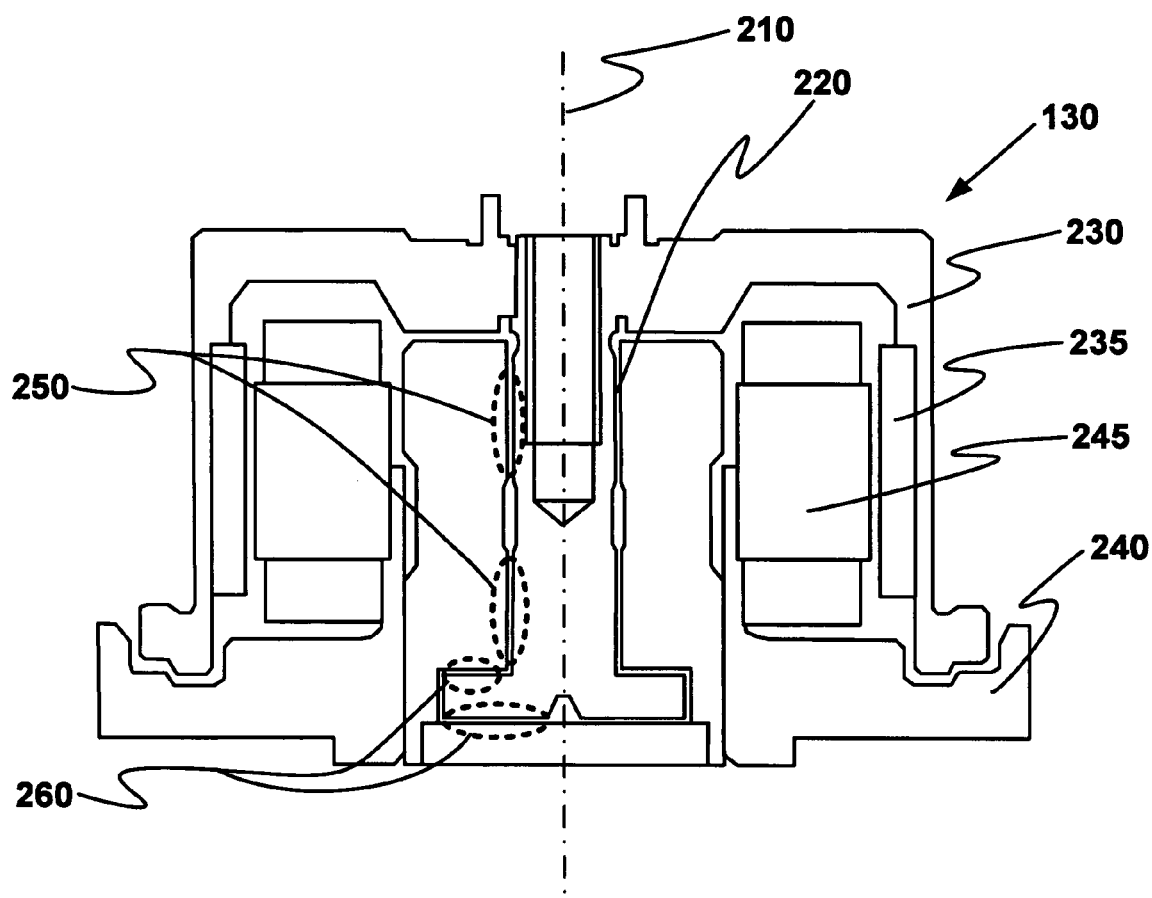
FIG. 2 is a cross-section view of motor-hub assembly in accordance with one embodiment of the present invention.

With reference now to FIGS. 1B and 2, a cross-section view 200 of motor-hub assembly 130 is shown in accordance with one embodiment of the present invention. In general, motor-hub assembly 130 supports disk stack 138 so that disk surface 135 can be spun adjacent to slider 155 and thus allow magnetic head 156 to read and write data tracks 136 on disk surface 135. A cross-section view 200 in FIG. 2, taken along section line 100 (FIG. 1B) reveals the inside structure of motor-hub assembly 130 and the FDB. For clarity, only half of cross-section view 200 is crosshatched. Several components are joined together to form rotor 230 and stator 240. Motor magnet 235, which is coupled to rotor 230 and motor winding 245, which is coupled to stator 240 are not crosshatched for clarity, but are considered to be parts of rotor 230 and stator 240. Gap 220 between rotor 230 and stator 240 is also not crosshatched. It should be appreciated that features shown in cross-section 200 are circular and symmetric about axis 210. Therefore, a feature shown or highlighted in cross-section 200 on one side of axis 210 is the same feature on the other side of axis 210.

Referring to FIG. 2, axis 210 is an axis of symmetry as well as the axis of rotation for motor-hub assembly 130 and disk pack 138. Since rotor 230 and stator 240 are the major structural components of motor-hub assembly 130, rotor 230 and stator 240 also share the same axes of symmetry and are coincident with axis 210. Rotor 230 is retained by its geometry to rotate about stator 240.

Gap 220 is comprised of the outer surface of rotor 230 and the inner surface of stator 240. Four zones of gap 220 are encircled in FIG. 2. Two are denoted as zones 250, and two zones are denoted as zones 260. Zones 250 produce radial stiffness for the FDB. Zones 260 produce axial stiffness for the FDB. Each surface is patterned in such a manner as to be conducive to supporting a film of fluid and to impart movement to this fluid, which is placed in gap 220. The moving fluid produces a film that is resistant to collapsing and hence prevents juxtaposed surfaces from coming in contact. This film couples rotor 230 to stator 240 such that rotor 230 maintains a constant separation (gap 220) from stator 240 while allowing rotor 230 to rotate freely. In accordance with embodiments of the present invention, the HDD is considered to be in boundary lubrication when the gap 220 approaches the roughness (not shown) of one or more of the surfaces forming the gap 220.

Figure 3:
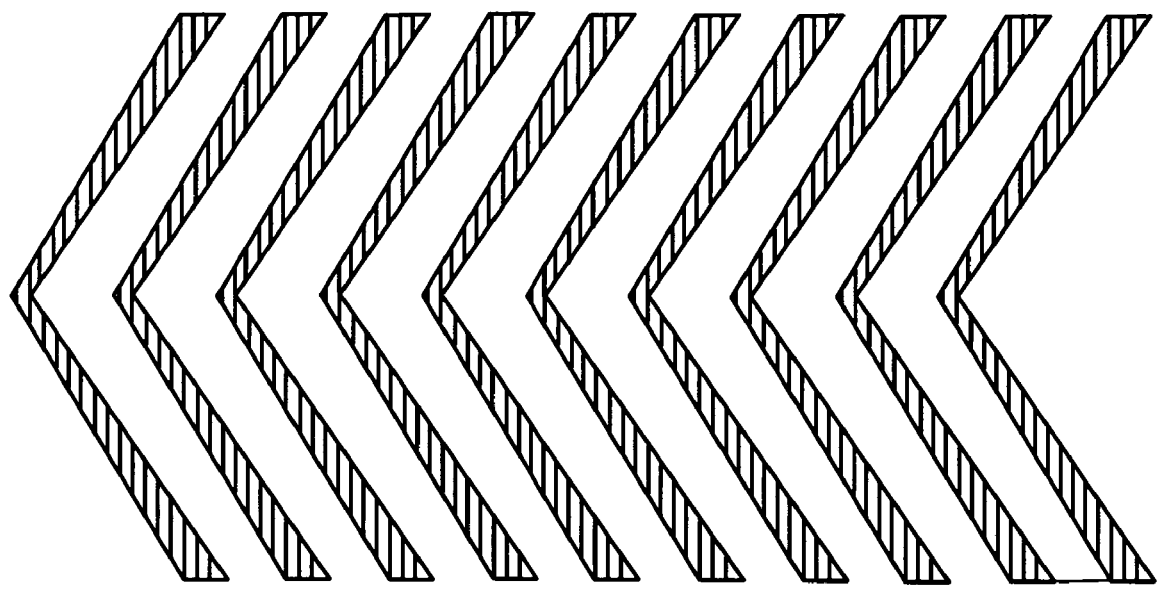
FIG. 3 is an exemplary herringbone groove pattern in accordance with one embodiment of the present invention.

With reference now to FIG. 3, a herringbone pattern fabricated into a surface in gap 220 is shown in accordance with an embodiment of the present invention. In general, herringbone pattern 300 is a series of grooves that are fabricated into a surface in gap 220 at zones 250. Typically herringbone pattern 300 is fabricated onto the inner surface of stator 240 in zones 250, and the juxtaposed surface of rotor 230 is a polished surface. Embodiments of this invention are not dependent upon which surface contains herringbone land and groove pattern 300, whether or not both surfaces contain herringbone pattern 300, or the pattern type of geometry.

Figure 4:
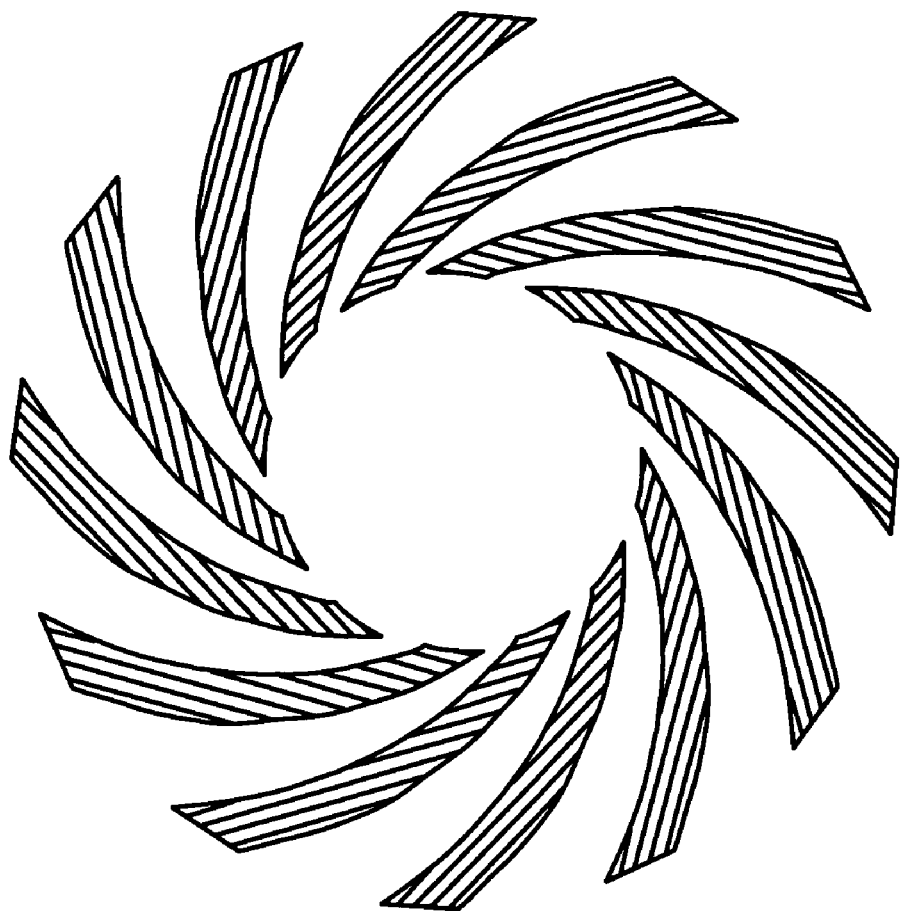
FIG. 4 is an exemplary spiral groove pattern in accordance with one embodiment of the present invention.

Referring now to FIG. 4, a spiral pattern fabricated into a surface in gap 220 is shown in accordance with an embodiment of the present invention. In general, spiral pattern 400 is a series of grooves that are fabricated into a surface in gap 220 at zones 260. Typically spiral pattern 400 is fabricated onto the surfaces of stator 240 in zones 260, and the juxtaposed surfaces of rotor 230 are polished. Embodiments of this invention are not dependent upon which surface contains a spiral pattern 400 or any other pattern, which surface is polished, or if one or both surfaces contain a land and groove pattern with any type of geometry.

Operation

It should be appreciated from FIGS. 2, 3, and 4 that rotor 230 and stator 240 require skill and clever technology to fabricate. The metal chosen to fabricate the components that comprise rotor 230 and stator 240 are chosen for their ease of machinability; their adaptability to fabrication technologies; and suitability for application in an FDB. A metal of choice has been bronze. Brass is also another metal of choice for fabricating the intricate herringbone pattern 300 and spiral pattern 400. These metals are categorized as yellow metal because of their yellow color. Any metal that contains copper as its major element is classified as yellow metal.

The moving fluid that comprises the fluid dynamic bearing is also a lubricating fluid or oil. The lubricating properties of the moving fluid are required for the occasion of contact between the juxtaposed surfaces of rotor 230 and stator 240. Contact occurs primarily upon start and stop of rotation of motor-hub assembly 130. At the operating condition of starting, the fluid in gap 220 is not moving and has not established the FDB. At the operating condition of stopping, the moving fluid in gap 220 ceases to move and the FDB is no longer established. However, in one embodiment of the invention, an extreme pressure lubrication additive is included in the lubrication fluid of the FDB to prevent metal on metal contact, especially during start and stop operation.

The lubricating properties of the moving fluid such as viscosity and conductivity should not change throughout the life of motor-hub assembly 130. (The moving fluid, which is also a lubricating fluid, for purposes of brevity and clarity, will from here on be referred to as oil.) In an embodiment of the present invention, the oil is organic oil, wherein organic oil contains atoms of carbon, hydrogen and oxygen. Since oil is a hydrocarbon, almost universally a hydrocarbon ester, it is subject to thermal oxidation. Oxidation starts when a carbon radical is generated through proton (hydrogen atom) abstraction from the oil molecule. This is a thermally activated process, so the rate increases exponentially with temperature. A carbon radical combines with oxygen to form peroxide and then hydroperoxide, which normally decompose through a finite transition state into at least two radicals. The radicals eventually recombine, or lead to polar products such as alcohols and acids on the original oil molecule. The polar groups associate oil molecules together by hydrogen bonding, thus increasing the oil viscosity.

In an effort to prevent increasing oil viscosity, antioxidants are added to the oil to intercept the carbon radicals. Each radical that is quenched consumes a finite increment of antioxidant. Not all radicals are quenched before the oxidation chain has a chance to propagate to form hydroxyl and carboxylic acid groups on some of the oil molecules. Carboxylic acid corrodes the juxtaposed surfaces of the FDB. Iron and copper in the FDB catalyze decomposition of hydroperoxide. The effect of this catalysis is that the antioxidant is depleted from the oil. The dissolved metal ions remain in the oil shuttling between oxidation states during the catalysis while continually depleting the antioxidant. The antioxidant will only prevent increasing oil viscosity until it is consumed through catalysis. The FDB will fail either through corrosion of the juxtaposed surfaces of the FDB or through oil viscosity change.

In one embodiment of the invention, the lubrication fluid comprises a primary antioxidant and a high pressure lubricant. In one embodiment of the invention, the high pressure lubricant comprises an organo-zinc compound. It is appreciated that the high pressure lubricant could also include tin, antimony, molybdenum, various hydrocarbon chains or any other material suitable for high pressure lubrication in accordance with embodiments of the present invention.

A primary antioxidant scavenges free radicals which inhibit oxidation by chain terminating reactions. Typically primary antioxidants have OH (hindered phenols) or NH (secondary aromatic amine) groups. In one embodiment of the invention, the high pressure lubricant is a secondary antioxidant. A secondary antioxidant is sometimes found to be synergistic with primary antioxidants. In one embodiment of the invention, the secondary antioxidant (e.g., high pressure lubricant) reacts with hydroperoxides in the lubricating fluid to form inert products that precipitate from the oil onto the metal surfaces in asperity contacts forming a boundary lubrication film that inhibits metal corrosion and reduces friction. This film protects the metal components especially during start and stop operation.

In one embodiment of the invention, the high pressure lubricant comprises a hydroperoxide decomposer comprising alkyl carbamates. Hydroperoxide decomposers that produce corrosion inhibiting anti-wear boundary films are, for example, Zn dialkyl dithiocarbamates. Specifically, two are Zn dibutyl dithiocarbamate or Zn diamyl dithiocarbatnate. An infinite variety of other types are also possible base in other types of metals such as Sn or Sb or Mo, and containing various alkyl groups.

An anti-wear film may also be obtained from Zn dialkyl dithiophosphates, alkali metal sulfonates, aryl phosphates, but these are not as effective as the carbamates because the carbamate remains soluble until it is needed. Rather than depositing immediately on all metal surfaces, the carbamate remains in solution until high temperature asperity contacts in boundary lubrication initiate oxidation and hydroperoxides. The oxidation reaction initiates the decomposition of the metal carbamate with then forms products that deposit on the asperities until the high temperatures are no longer generated. The rest of the carbamate remains intact in solution until further asperity contacts etc.

Figure 5:
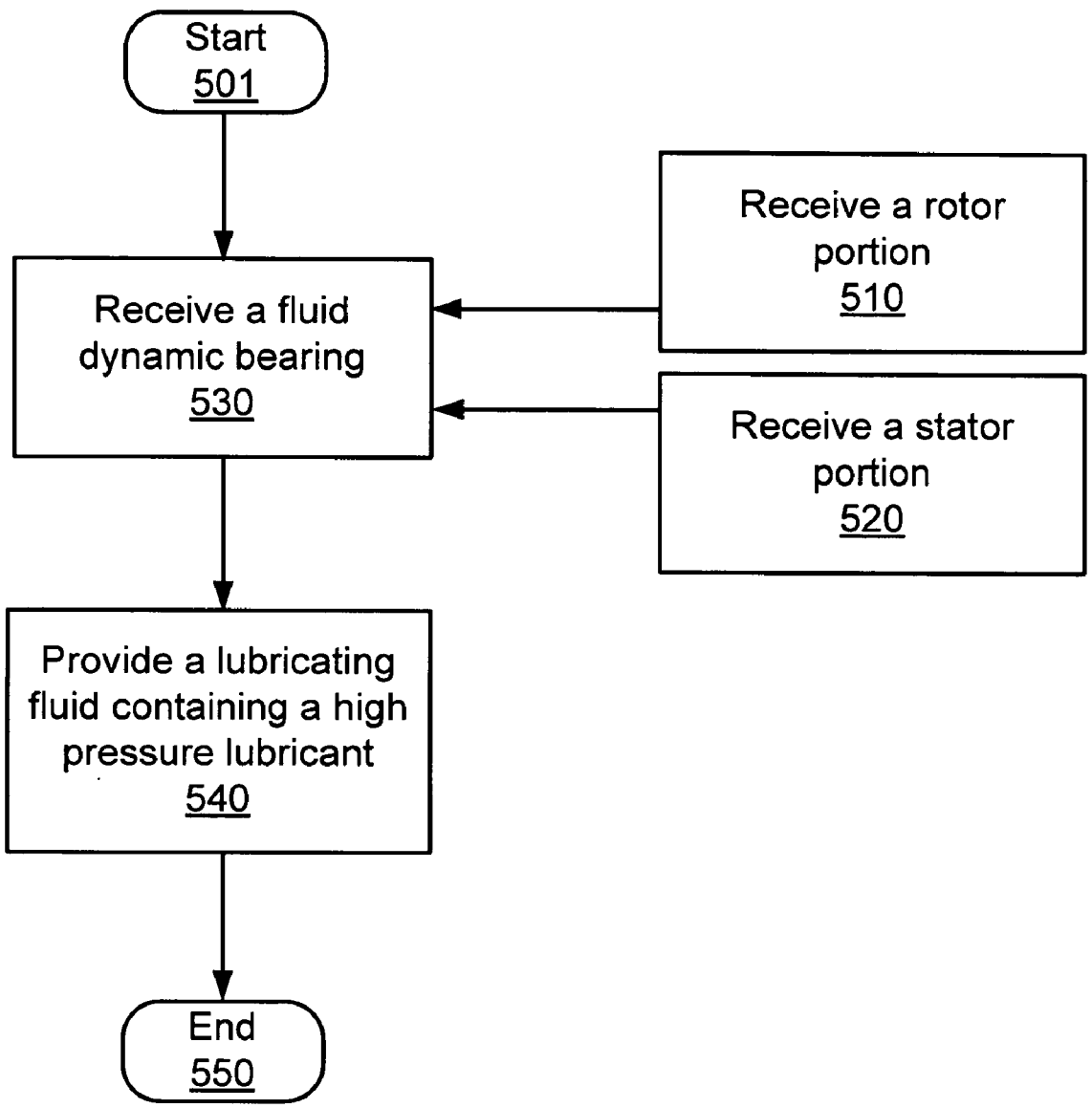
FIG. 5 is a flow chart illustrating the steps of a method for improving high pressure lubrication in a fluid dynamic bearing in accordance with one embodiment of the present invention.

FIG. 5 is a flow chart of a process 500 in which particular steps are performed in accordance with an embodiment of the present invention for improving lubrication in a fluid dynamic bearing. FIG. 5 includes processes of the present invention, which in one embodiment, are carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium. Although specific steps are disclosed in process 500, such steps are exemplary. That is, the present invention is well suited to performing various other steps or variations of the steps recited in FIG. 5. Within the present embodiment, it should be appreciated that the steps of process 500 may be performed by software, by hardware, by an assembly mechanism, through human interaction, or by any combination of software, hardware, assembly mechanism, and human interaction.

In step 501 of process 500, the process for reducing corrosion in a fluid dynamic bearing is initiated in an embodiment in accordance with the present invention.

In step 510 of process 500, a rotor portion is received and introduced to the fluid dynamic bearing in an embodiment in accordance with the present invention.

In step 520 of process 500, a stator portion is received and introduced to the fluid dynamic bearing in an embodiment in accordance with the present invention.

In step 530 of process 500, the fluid dynamic bearing is received in an embodiment in accordance with the present invention.

In step 540 of process 500, lubricating fluid comprising a first antioxidant and a second antioxidant wherein the second antioxidant comprises a high pressure lubricant is provided in an embodiment in accordance with the present invention.

In step 550 of process 500, the process ends. The end result of process 500 is improving lubrication in a fluid dynamic bearing especially during boundary lubrication (e.g., start stop operations) in an embodiment in accordance with the present invention.

In one embodiment of the invention, the lubricating fluid comprises ester oil, however, it is appreciated that the lubricating oil could be any oil in accordance with embodiments of the present invention.

In one embodiment of the invention, the second antioxidant comprises a sulfonate, a cabamate or a napthenate in accordance with embodiments of the present invention.

In one embodiment of the invention, the first and second antioxidants are both primary antioxidants (e.g., are both scavenge free radicals). However, it is appreciated that at least one of the first or second antioxidants comprises a high pressure lubricant in accordance with embodiments of the present invention. In one embodiment of the invention, the high pressure lubricant comprises an organo-zinc compound.

In one embodiment the high pressure lubricant includes the first and second antioxidant and an Mo-containing dispersant such as modified polyisobutylene succininc anhydride/polyamine. Mo-containing dispersant enhances the antiwear film properties of the high pressure lubricant. Other types of metals may be dispersed in the lubricating fluid by various other types organic dispersants.

Thus, embodiments described herein solve the unanticipated problem of wear and contact of the rotor 230 and stator 240, especially during start and stop operations by incorporating a high pressure lubricant in the fluid dynamic bearing lubricant oil. Advantageously, the present invention, in the various embodiments further provides reliability and longevity of an FDB. Reliability and longevity are obtained by improving boundary lubrication by protecting the components with a high pressure lubricant.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for improving lubrication in a fluid dynamic bearing comprising:
   receiving a fluid dynamic bearing comprising:
      receiving a rotor portion; and
      receiving a stator portion;
   providing a herringbone pattern for radial stiffness of said fluid dynamic bearing, wherein said herring bone pattern is disposed between a shaft of said stator portion and an inner diameter of said rotor portion; and
   providing a lubricating fluid in said herringbone pattern between said rotor portion and said stator portion, wherein said lubricating fluid comprises a first antioxidant and a second antioxidant, said second antioxidant providing extreme pressure protection of said rotor portion and said stator portion of said fluid dynamic bearing.

2. The method of claim 1 further comprising:
utilizing an ester oil in said lubricating fluid.

3. The method of claim 1 further comprising:
utilizing a sulfonate, a carbamate or a naphthenate in said second antioxidant.

4. The method of claim 1 wherein said first antioxidant and said second antioxidant are primary antioxidants.

5. The method of claim 1 wherein said second antioxidant comprises an organo-zinc compound.

6. A fluid dynamic bearing comprising:
   a lubricating fluid containing an organic oil;
   a rotor; comprising:
      an axis of rotation; and
      a surface conducive to supporting a film of said lubricating fluid; and
   a stator comprising:
      an axis coincident to said axis of rotation;
      a herringbone pattern configured for radial stiffness of said fluid dynamic bearing, wherein said herring bone pattern is disposed between a shaft of said stator and an inner diameter of said rotor; and
   a complimentary surface juxtaposed to said rotor which is conducive to supporting said lubricating fluid in said herringbone pattern such that said rotor is rotatably retained;
   wherein said lubricating fluid comprises an antioxidant and a high pressure lubricant for protecting said rotor surface and said stator complimentary surface juxtaposed to said rotor.

7. The fluid dynamic bearing of claim 6 wherein said lubricating fluid comprises an ester oil.

8. The fluid dynamic bearing of claim 6 wherein said high pressure lubricant comprises a sulfonate, a carbamate or a naphthenate.

9. The fluid dynamic bearing of claim 6 wherein said first antioxidant and said high pressure lubricant are primary antioxidants.

10. The fluid dynamic bearing of claim 6 wherein said high pressure lubricant comprises an organo-zinc compound.

11. The fluid dynamic bearing of claim 6 wherein said lubricating fluid comprises alkylated phenol, dioctyl diphenyl amine, octylated phenyl naphthylamine, alkyl-aryl amine oligomers, Zn diamyldithiocarbamate or Zn dibutyldithiocarbamate.

12. A disk drive system comprising:
   a rotatably mounted magnetic disk;
   a rotor coupled to said magnetic disk;
   a stator for rotatably retaining said rotor;
   a motor coupled to said rotor for rotating said magnetic disk via said rotor;
   a fluid dynamic bearing that couples said stator to said rotor;
   a herringbone pattern configured for radial stiffness of said fluid dynamic bearing, wherein said herring bone pattern is disposed between a shaft of said stator and an inner diameter of said rotor; and
   a lubricating fluid utilized in said herringbone pattern of said fluid dynamic bearing, wherein said lubricating fluid comprises a first antioxidant and a second antioxidant wherein said second antioxidant comprises a high pressure lubricant for protecting said fluid dynamic bearing during start and stop of said disk drive system.

13. The disk drive of claim 12 wherein said lubricating fluid comprises an organic oil.

14. The disk drive of claim 12 wherein said high pressure lubricant comprises a sulfonate, a carbamate or a naphthenate.

15. The disk drive of claim 12 wherein said first antioxidant and said high pressure lubricant are primary antioxidants.

16. The disk drive of claim 12 wherein said high pressure lubricant comprises an organo-zinc compound.

17. The disk drive of claim 12 wherein wherein said lubricating fluid comprises alkylated phenol, dioctyl diphenyl amine, octylated phenyl naphthylamine, alkyl-aryl amine oligomers, Zn diamyldithiocarbamate or Zn dibutyldithiocarbamate.

18. The disk drive of claim 12 wherein said high pressure lubricant protects said fluid dynamic bearing when less than one micron of said lubricating fluid is between said stator and said rotor.

* * * * *